under 35

(12) United States Patent  
Robins et al.

(10) Patent No.: US 8,529,721 B2  
(45) Date of Patent: Sep. 10, 2013

(54) AUTOMATED ELONGATE INSERT WRAPPING SYSTEM

(75) Inventors: Brian G. Robins, Renton, WA (US); Darrell D. Jones, Mill Creek, WA (US); Kurtis S. Willden, Kent, WA (US); Daniel M. Rotter, Lake Forest Park, WA (US)

(73) Assignee: The Boeing Company, Chicago, IL (US)

( * ) Notice: Subject to any disclaimer, the term of this patent is extended or adjusted under 35 U.S.C. 154(b) by 95 days.

(21) Appl. No.: 13/548,057

(22) Filed: Jul. 12, 2012

(65) Prior Publication Data

US 2012/0273121 A1 Nov. 1, 2012

Related U.S. Application Data

(62) Division of application No. 12/337,931, filed on Dec. 18, 2008, now Pat. No. 8,257,536.

(51) Int. Cl.
*B32B 37/00* (2006.01)
(52) U.S. Cl.
USPC ............... 156/227; 156/52; 156/53; 156/54; 156/56; 156/200; 156/201; 156/202; 156/213; 156/226; 156/463; 156/464; 156/467; 156/477.1; 156/475

(58) Field of Classification Search
USPC ............... 156/52, 53, 54, 56, 200, 201, 202, 156/213, 226, 227, 463, 464, 467, 477.1, 156/475
See application file for complete search history.

(56) References Cited

U.S. PATENT DOCUMENTS

| | | | |
|---|---|---|---|
| 2,688,829 | A | 9/1954 | Geffroy et al. |
| 3,547,930 | A | 12/1970 | Blomqvist et al. |
| 4,645,549 | A | 2/1987 | Lalor |
| 2010/0154984 | A1 | 6/2010 | Robins et al. |

OTHER PUBLICATIONS

USPTO Requirement for Restriction dated Jun. 13, 2011 regarding U.S. Appl. No. 12/337,931, 6 pages.
Response to Restriction Requirement dated Jun. 24, 2011 regarding U.S. Appl. No. 12/337,931, 5 pages.
USPTO Office Action dated Nov. 22, 2011 regarding U.S. Appl. No. 12/337,931, 11 pages.
Response to Office Action dated Jan. 17, 2012 regarding U.S. Appl. No. 12/337,931, 10 pages.
USPTO Notice Allowance dated Apr. 20, 2012 regarding U.S. Appl. No. 12/337,931, 8 pages.
Amendment after Allowance dated Jul. 19, 2012 regarding U.S. Appl. No. 12/337,931, 4 pages.

*Primary Examiner* — Katarzyna Wyrozebski Lee
*Assistant Examiner* — Joshel Rivera
(74) *Attorney, Agent, or Firm* — Yee & Associates, P.C.

(57) ABSTRACT

A method and apparatus for a tray, a folding section connected to the tray, and a tape application system. The tray has a channel for receiving an elongate insert for a composite material with a number of layers for a release system. The folding section is capable of folding a number of layers around the elongate insert to cover the elongate insert as the elongate insert is moved through the folding unit. The tape application system is capable of applying a tape to the number of layers for covering the elongate insert to form the release system.

8 Claims, 7 Drawing Sheets

AUTOMATED ELONGATE INSERT WRAPPING SYSTEM

This application is a divisional application of U.S. application Ser. No. 12/337,931, entitled "AUTOMATED ELONGATE INSERT WRAPPING SYSTEM," filed Dec. 18, 2008, status Allowed.

BACKGROUND INFORMATION

1. Field

The present disclosure relates generally to manufacturing and, in particular, to manufacturing composite parts. Still more particularly, the present disclosure relates to a method and apparatus for preparing elongate inserts for use in manufacturing composite parts.

2. Background

Aircraft are being designed and manufactured with greater and greater percentages of composite materials. Some aircraft may have more than fifty percent of their primary structure made from composite materials. Composite materials may be used in aircraft to decrease the weight of the aircraft. This decreased weight may improve payload capacities and fuel efficiencies. Further, composite materials may provide longer service life for various components in an aircraft.

Composite materials may be tough, light-weight materials, created by combining two or more dissimilar components. For example, a composite may include fibers and resins. The fibers and resins may be combined to form a cured composite material.

Further, by using composite materials, portions of an aircraft may be created in larger pieces or sections. For example, a fuselage in an aircraft may be created in cylindrical sections that may be put together to form the fuselage of the aircraft. Other examples may include without limitation wing sections joined to form a wing or stabilizer sections joined to form a stabilizer.

In manufacturing composite parts from composite materials, cavities may be formed within composite parts. For example, stiffening or reinforcement sections may be formed on composite parts. These stiffening elements may be referred to as stringers. Stringers may have cavities and may be used in various composite parts, such as fuselage sections, wall panels, and/or other suitable parts for reinforcing or providing greater rigidity for those parts.

In creating stringers, a cavity or open space is formed in a composite part. These cavities may be formed using elongate inserts, such as, for example, mandrels or bladders. These elongate inserts may be used to form pressure within a cavity during curing of a stringer. Typically, the elongate inserts are wrapped in a release film to allow for the elongate insert to be extracted from the composite part after the curing process.

The process of wrapping and/or securing these materials around the elongate inserts is performed by human operators. This process may be time consuming. Further, in some cases, the material wrapping the elongate insert may not be properly secured, secured too loosely, and/or have some other problem. These issues may lead to problems with extracting the elongate insert from the cavity after curing of the composite part. In some cases, the material may be left inside the cavity after removing the elongate insert. These situations may not be desirable.

Heat shrink release materials also may be used to cover these elongate inserts. The materials may be placed around the elongate inserts and then treated with heat to provide a tight fit.

Heat shrink materials, however, require the application of heat over the entire distance of the elongate insert. These heat shrink materials also are made to a precise size for each stringer. These materials also may distort a cross section of an elongate insert when the elongate insert takes the form of a bladder. When a rubber mandrel is used as the elongate insert, the heat shrink material also may distort the cross section of this type of elongate insert.

Therefore, it would be advantageous to have a method and apparatus that addresses at least some of the issues discussed above.

SUMMARY

In one advantageous embodiment, an apparatus comprises a tray, a folding section connected to the tray, and a securing system. The tray has a channel for receiving an elongate insert for a composite material with a number of layers for a release system. The folding section is capable of folding the number of layers around the elongate insert to cover the elongate insert as the elongate insert is moved through the folding unit. The securing system is capable of securing the number of layers covering the elongate insert to form the release system.

In another advantageous embodiment, an apparatus for covering an elongate insert with a release system for use in manufacturing a composite stringer for a composite aircraft part comprises a tray, a folding section connected to the tray, a tape application system, and a force generation system. The tray has a channel for receiving an elongate insert for a composite material with a number of layers for the release system. The folding section is capable of folding the number of layers around the elongate insert to cover the elongate insert as the elongate insert is moved through the folding unit. The tape application system is capable of applying a tape to the number of layers covering the elongate insert. The tape application system comprises a tape dispenser capable of dispensing the tape and a tape applicator roller capable of applying the tape dispensed by the tape dispenser onto the number of layers to secure the number of layers around the elongate insert to form the release system. The force generation system is capable of forcing excess material in the number of layers inwards towards a center line of the channel. The force generation system comprises at least one of a number of rollers capable of applying a force to the excess material in the number of layers and a number of flexible flattening members capable of applying the force to the excess material in the number of layers.

In yet another advantageous embodiment, a method is present for wrapping an elongate insert for a stringer with a number of layers for a release system. The elongate insert with a number of layers is moved in a channel in a tray through a folding section. The folding section folds the number of layers around the elongate insert. The elongate insert is moved in the channel with the number of layers folded over the elongate insert through a force generation system. The force generation system forces excess material towards a center line of the channel such that the number of layers is flattened. The elongate insert is moved in the channel with the number of layers flattened by the force generation system through a securing application system. The securing system secures the number of layers covering the elongate insert to form the release system.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
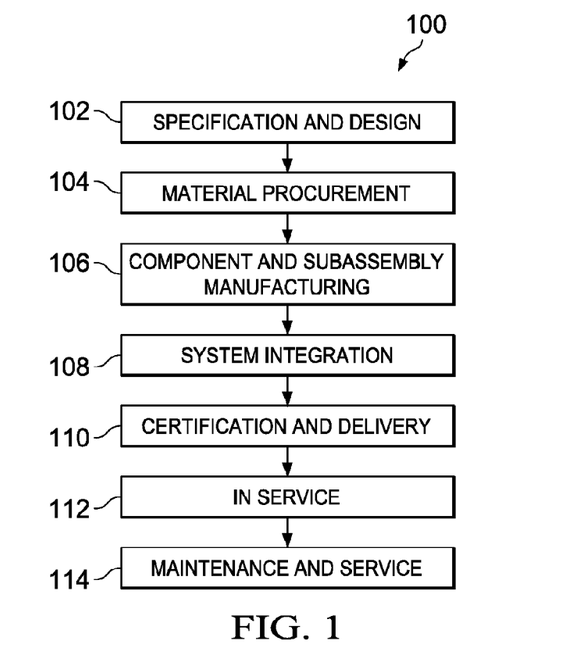
FIG. 1 is a diagram illustrating an aircraft manufacturing and service method in accordance with an advantageous embodiment.
Figure 2:
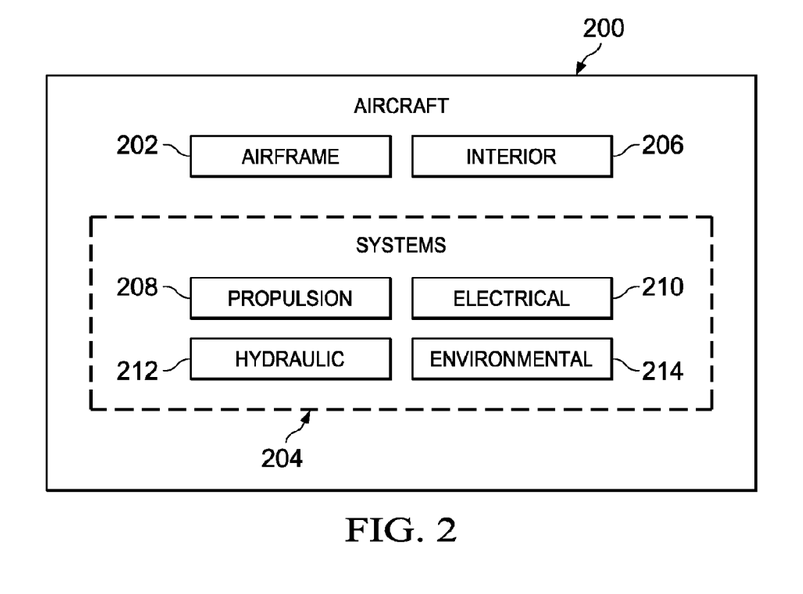
FIG. 2 is a diagram of an aircraft in which an advantageous embodiment may be implemented.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

For example, advantageous embodiments may be implemented in component and subassembly manufacturing to manufacture composite parts for aircraft 200. Different advantageous embodiments may be used to prepare elongate inserts for use in creating cavities in composite parts. Additionally, advantageous embodiments may be implemented during maintenance and service 114 to create replacement composite parts, upgrade composite parts, or other suitable composite parts for use in modification, reconfiguration, refurbishment, or performing some other maintenance or service on aircraft 200.

An elongate insert with a release system may be placed into a cavity of a composite part for processing. Composite material for the composite part may be laid up around an elongate insert with a release system. The elongate insert may be removed from the cavity after processing of the composite part. For example, the release system may allow for the removal of an elongate insert, such as a bladder or mandrel, to be removed from a cavity after curing of a composite part.

The different advantageous embodiments recognize and take into account that currently used methods may be imprecise in covering an elongate insert with a release system that is capable of removing the elongate insert from a composite part after curing of the composite part. The different advantageous embodiments recognize that with composite parts in the form of stringers, some release systems may be limited for a particular length of stringer. As a result, the different advantageous embodiments recognize and take into account that if another length stringer is to be manufactured, another release system may need to be obtained for that particular length.

Thus, the different advantageous embodiments provide a method and apparatus for preparing an elongate insert for use in manufacturing a composite part. An elongate insert is a component or part capable of being used to manufacture a composite part that has a length that is a width of the component or part. A tray having a channel receives an elongate insert for a composite material with a number of layers for a release system. A folding section is connected to the channel in the tray.

The folding section is capable of folding the number of layers around the elongate insert to cover the elongate insert as the elongate insert is moved through the folding unit. A securing system, such as a tape application system is capable of applying tape to the number of layers for covering the elongate insert. The tape secures the number of layers for the elongate insert to form the release system. Additionally, the apparatus may have a roller system capable of forcing excess material in the number of layers inwards towards a center line of the elongate insert.

Figure 3:
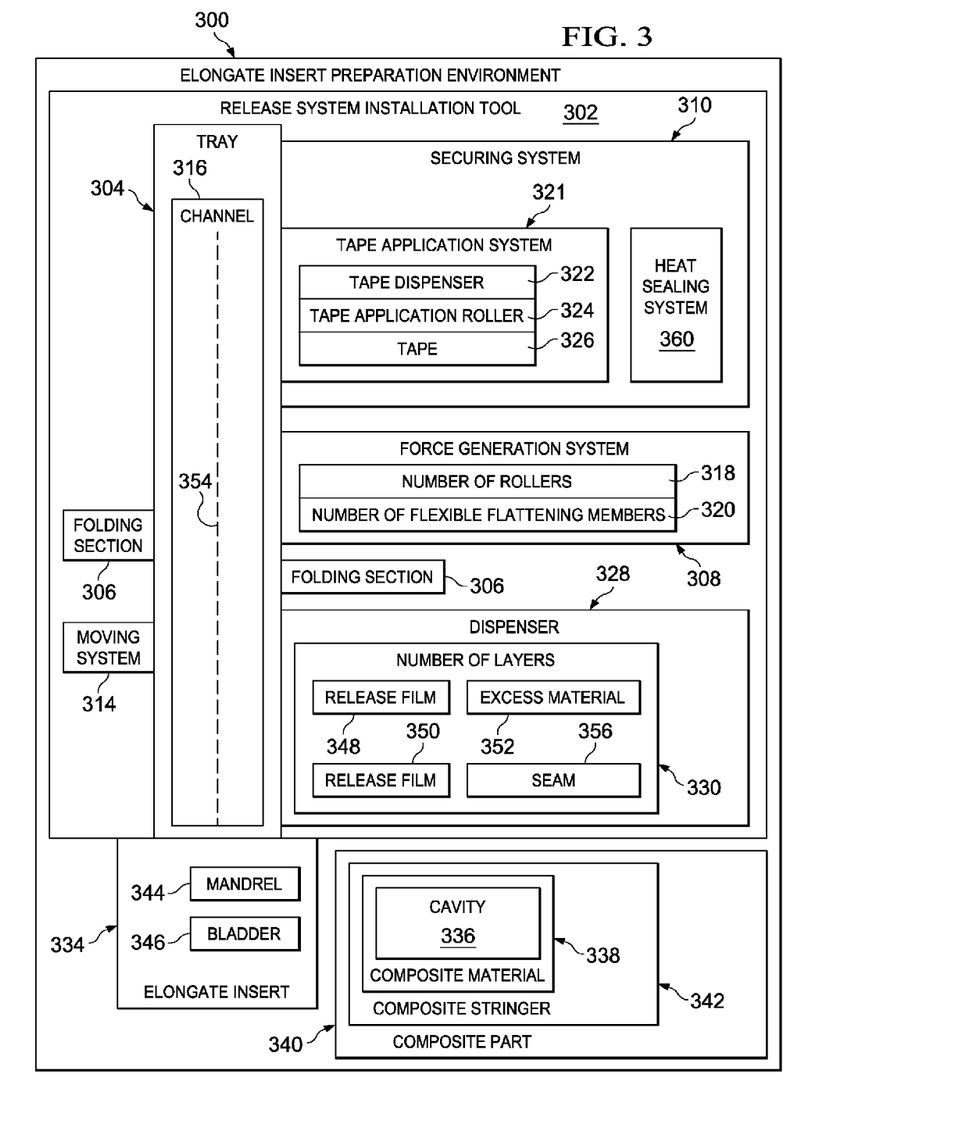
FIG. 3 is a diagram illustrating an elongate insert preparation environment in accordance with an advantageous embodiment.

With reference now to FIG. 3, a diagram illustrating an elongate insert preparation environment is depicted in accordance with an advantageous embodiment. In this example, elongate insert preparation environment 300 includes release system installation tool 302. Release system installation tool 302 includes tray 304, folding section 306, force generation system 308, and securing system 310. Tray 304 has channel 316. Folding section 306 may be attached to and/or formed as part of tray 304. Force generation system 308 may include number of rollers 318 and number of flexible flattening members 320. A number of items, as used herein, refers to one or more items. For example, number of rollers 318 is one or more rollers, and number of flexible flattening members 320 is one or more flexible flattening members.

Securing system 310 may be, for example, tape application system 321, and may include tape dispenser 322, tape application roller 324, and tape 326. Release system installation tool 302 also may include dispenser 328, which may dispense number of layers 330. Number of layers 330 may be dispensed from one or more rolls in dispenser 328. Number of layers 330 may be cut as each elongate insert is processed. Alternatively, the layers may be cut after processing. Further, in some advantageous embodiments, number of layers 330 may be present on a single roll within dispenser 328.

Release system installation tool 302 may be used to prepare elongate insert 334 for placement into cavity 336 of composite material 338 to form composite part 340. In these examples, composite part 340 may be, for example, stringer 342.

Elongate insert 334 may take various forms. For example, without limitation, elongate insert 334 may be mandrel 344, bladder 346, or some other suitable type of insert.

In preparing elongate insert 334 for use in manufacturing composite part 340, number of layers 330 may be placed onto tray 304 from dispenser 328. Number of layers 330 may be one or more layers. Number of layers 330 may be, for example, release film 348. In some advantageous embodiments, number of layers 330 also may include release film 350 and/or any other suitable material.

Release film 348 may be a thin plastic film treated to avoid bonding with composite material 338. Release film 348 may be stretchable to conform to various complex geometries.

Number of layers 330 may be obtained from dispenser 328 and placed onto tray 304. Elongate insert 334 may be placed onto number of layers 330 on tray 304 into channel 316. Channel 316 is capable of receiving elongate insert 334. The top of elongate insert 334 may be around the same height as the surface of tray 304 outside of channel 316, depending on the particular implementation.

Moving system 314 may engage elongate insert 334 and/or number of layers 330 and move elongate insert 334 along with number of layers 330 along channel 316 through folding section 306. Folding section 306 may fold number of layers 330 over elongate insert 334 to cover elongate insert 334 as elongate insert 334 and number of layers 330 move through folding section 306.

Number of layers 330 in the folded condition may then be moved through force generation system 308. Components such as number of rollers 318 and number of flexible flattening members 320 may move excess material 352 in number of layers 330 towards center line 354 of release system installation tool 302. Flattening members 320 may be flexible elongate plates, flat wooden sticks, or some other structure that is capable of moving excess material 352 towards center line 354 and/or flatten excess material 352. In these examples, center line 354 may be a center line for channel 316 in tray 304. Excess material 352 may be any material in number of layers 330 that may not lay flat on the surface of elongate insert 334.

Thus, elongate insert 334 with number of layers 330 in a flat and/or smooth condition on the surface of elongate insert 334 and number of layers 330 may have seam 356 on which tape 326 may be applied from tape dispenser 322 and pressed onto elongate insert 334 with number of layers 330 by tape applicator roller 324. Tape 326 may take a number of different forms.

Tape 326 may be any tape that will not bond to a composite material during a curing process. For example, tape 326 may be made from a polytetrafluoroethylene film. An example of this type of film is a Teflon® tape. Teflon® is a registered trademark of the DuPont Company. In these examples, seam 356 may be a location where an edge of number of layers 330 lays over another portion of number of layers 330.

When elongate insert 334 has been moved completely through release system installation tool 302, number of layers 330 may have been wrapped around elongate insert 334 and tape 326 may have been placed onto number of layers 330 in a manner that secures number of layers 330 around elongate insert 334.

Moving system 314 may be an automated system that pulls and/or pushes elongate insert 334 and number of layers 330 through tray 304. Multiple elongate inserts with multiple numbers of layers may be placed serially and fed into release system installation tool 302. As a result, another elongate insert may be placed onto tray 304 before elongate insert 334 has been completely prepared.

The illustration of elongate insert preparation environment 300 is not meant to imply physical or architectural limitations to the manner in which different advantageous embodiments may be implemented. Other components may be used in addition to or in place of the ones illustrated. In some advantageous embodiments, some of the illustrated components may be omitted.

For example, in some advantageous embodiments, force generation system 308 may not include number of flexible flattening members 320. Further, in some advantageous embodiments, moving system 314 may not be an automated moving system, but may be a human operator pushing and/or pulling elongate insert 334 and number of layers 330 to prepare elongate insert 334 for use in manufacturing composite part 340.

As another illustrative example, in some advantageous embodiments, tape application system 321 may be unnecessary if number of layers 330 is comprised of a material that can be heat sealed. With this example, securing system 310 may be heat sealing system 360, which may be implemented using any number of devices capable of heat sealing the material.

In still other advantageous embodiments, other inserts in addition to and/or in place of mandrels and bladders may be used. For example, any pressure intensifier element may be used. Also, the inserts with the release system installed can be used in manufacture many types of composite parts in addition to stringers. For example, the inserts with the release systems may be used to manufacture a frame, a C channel, an I beam, stiffeners, and other suitable parts.

Figure 4:
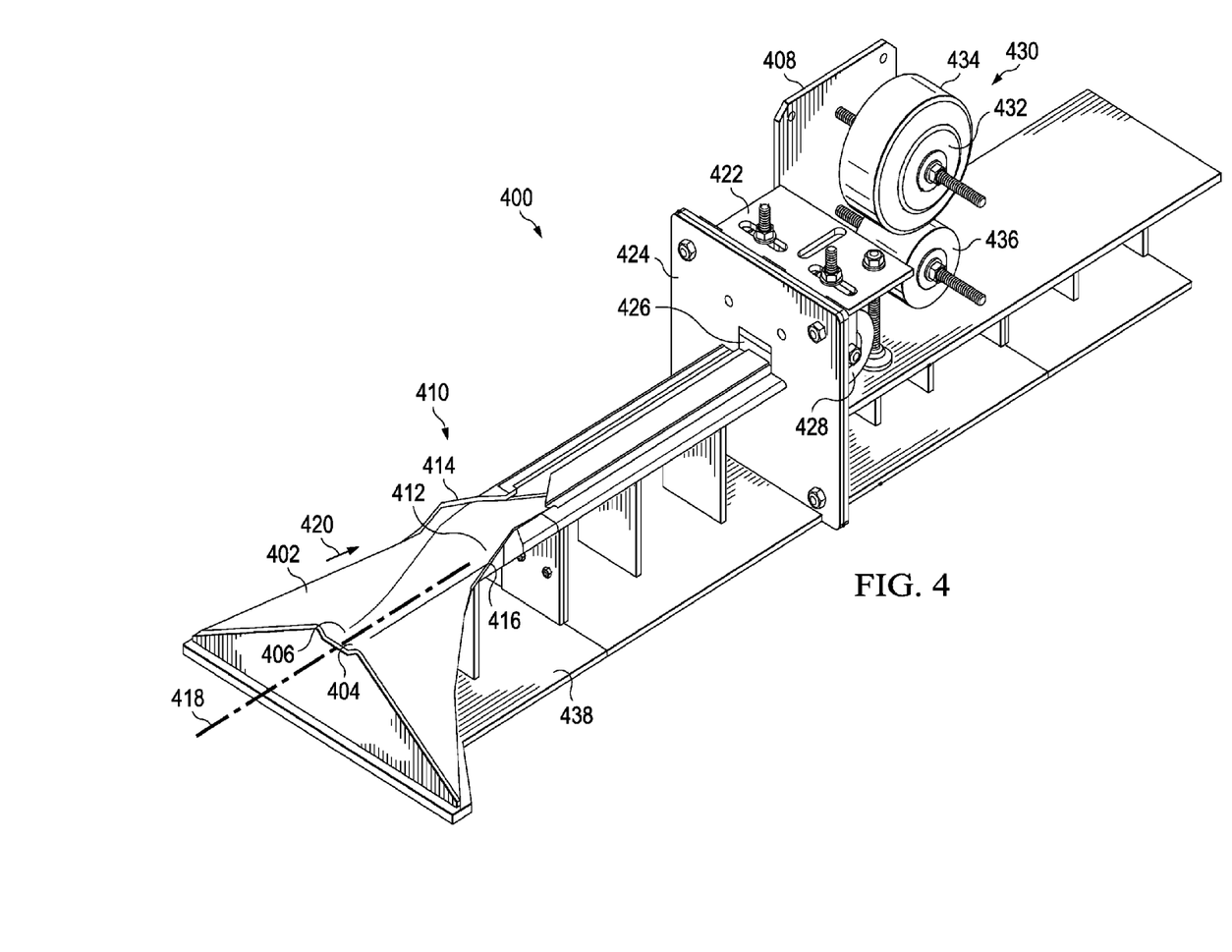
FIG. 4 is a diagram illustrating a release system installation tool in accordance with an advantageous embodiment.

With reference now to FIG. 4, a diagram illustrating a release system installation tool is depicted in accordance with an advantageous embodiment. In this example, release system installation tool 400 is an example of one implementation of release system installation tool 302 and elongate insert preparation environment 300 in FIG. 3.

Release system installation tool 400 has tray 402 with channel 404. Tray 402 may receive an elongate insert with a number of layers around end 406. The elongate insert may be removed from tray 402 at end 408 in these examples.

In this illustrative example, folding section 410 may have base 412, which is part of channel 404 in these examples. Folding section 410 has sides 414 and 416, which extend from base 412. Sides 414 and 416 converge on center line 418 of release system installation tool 400 in the direction of arrow 420. This convergence of sides 414 and 416 is capable of folding a number of layers over an insert placed into channel 404 of tray 402 and moved in the direction of arrow 420.

In this example, force generation system 422 is attached to plate 424. Plate 424 includes opening 426 through which tray 402 extends. An elongate insert may be moved through opening 426 in these examples, such that force generation system 422 may apply force to move any excess material towards center line 418.

In this example, force generation system 422 may include a number of rollers, such as roller 428. Tape application system 430 may be located adjacent to force generation system 422. Tape application system 430 may include tape dispenser 432, which may hold tape 434. Tape applicator roller 436 may press tape 434 onto a number of layers and an elongate insert moved through tray 402. In this example, tray 402 may be supported by base 438. In these illustrative examples, base 438 may be used to provide a height suitable for handling a number of layers and an elongate insert.

Release system installation tool 400 may have any dimension suitable for installing a release system onto an insert. For example, release system installation tool 400 may be around 2 feet to around 100 feet long, depending on the length of the insert. Release system installation tool 400 may be around 6 inches wide and around 8 inches tall.

Figure 5:
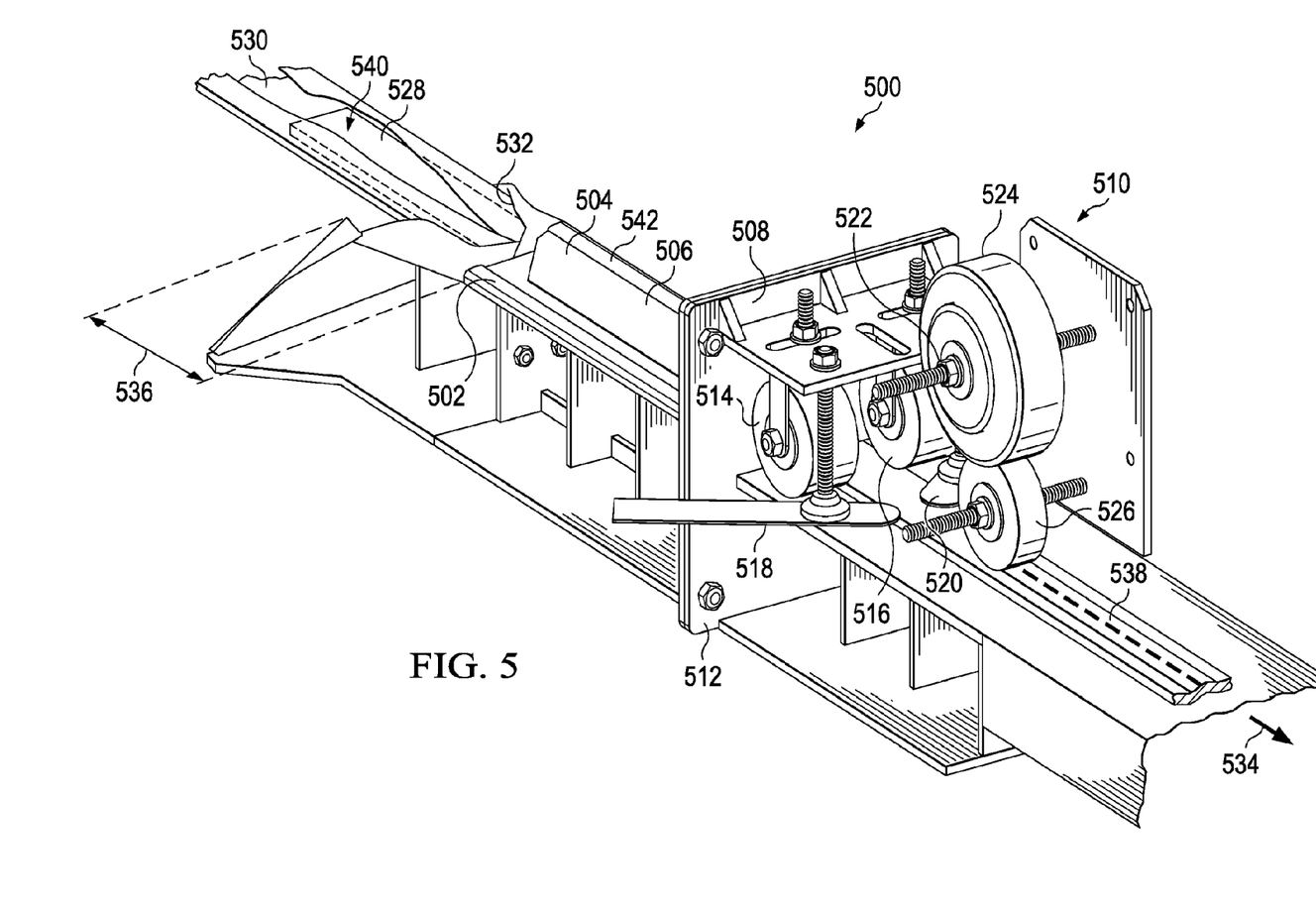
FIG. 5 is a diagram of a release system installation tool with a mandrel in accordance with an advantageous embodiment.

With reference now to FIG. 5, a diagram of a release system installation tool with a mandrel is depicted in accordance with an advantageous embodiment. Release system installation tool 500 is an example of one implementation of release system installation tool 302 in FIG. 3.

In this illustrative example, release system installation tool 500 has tray 502 with channel 504, folding section 506, force generation system 508, and tape application system 510. As can be seen in this view of release system installation tool 500, force generation system 510 may be attached to plate 512 and may include rollers 514 and 516. Force generation system 508 also includes flexible flattening members 518 and 520. **

Tape application system 510 includes tape dispenser 522, which may dispense tape 524 for application by tape applicator roller 526.

In this depicted example, mandrel 528 is an example of one implementation of an elongate insert such as elongate insert 334 in FIG. 3. Mandrel 528 with release film 530 is placed into channel 504 on tray 502 at end 532. Mandrel 528 and release film 530 are moved into folding section 506 in the direction of arrow 534. As can be seen, release film 530 may be folded over around section 536 as mandrel 528 and release film 530 move through folding section 506.

In these examples, roller 514 and roller 516 are positioned and/or cantered inward toward center line 538 to generate force downward and/or inwards toward center line 538 of release system installation tool 500. This force may be capable of moving any excess material in release film 530 towards center line 538 in a manner that flattens release film 530 against surface 540 of mandrel 528. In these examples, channel 504 is configured such that mandrel 528 and release film 530 fit within channel 504 such that surface 540 of mandrel 528 is substantially the same height as surface 542 of tray 502 outside of channel 504.

Figure 6:
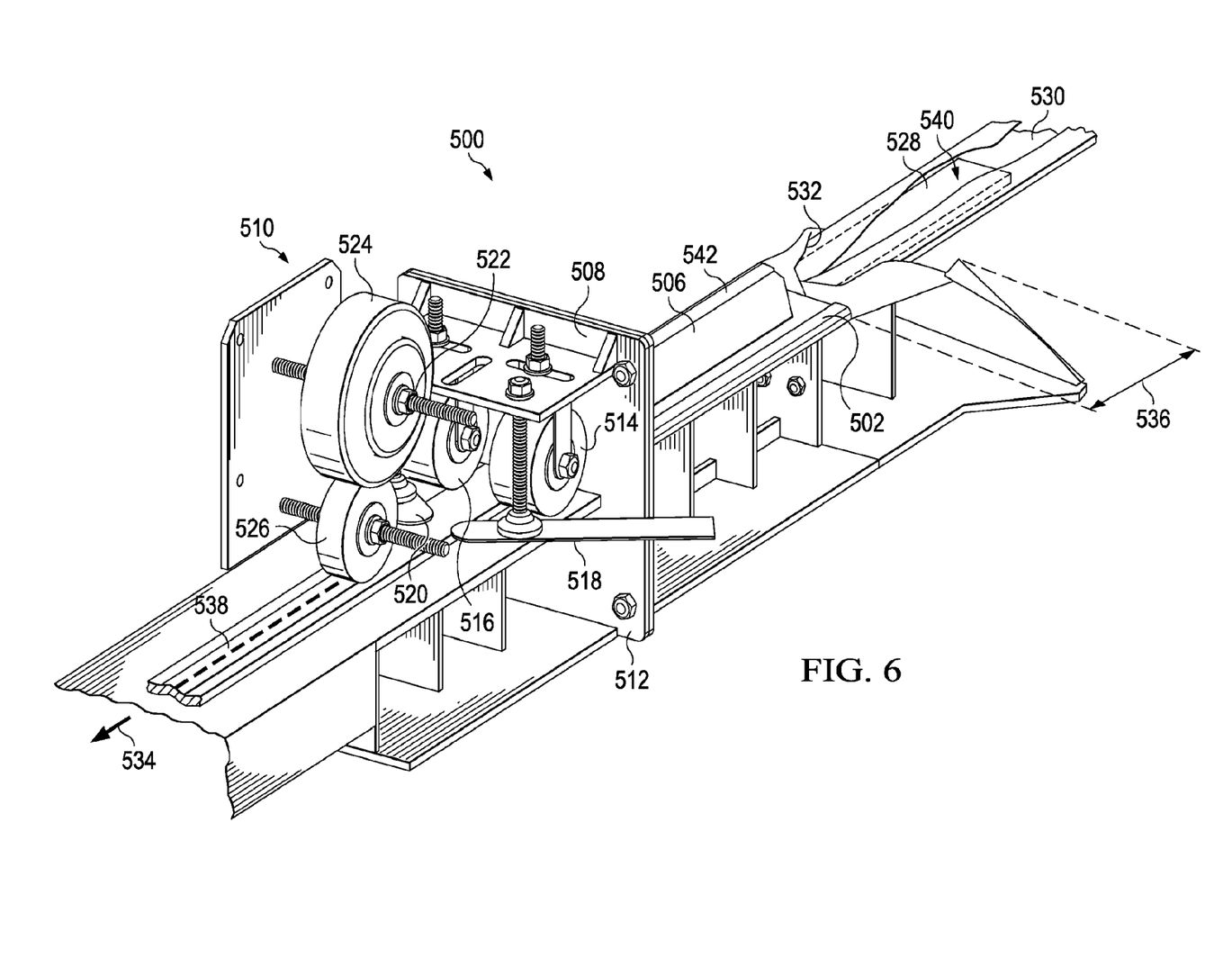
FIG. 6 is a diagram of another view of a release system installation tool in accordance with an advantageous embodiment.

With reference now to FIG. 6, a diagram of another view of a release system installation tool is depicted in accordance with an advantageous embodiment. In this depicted example, release system installation tool 500 applies tape 524 to mandrel 528 to secure release film 530 in place around mandrel 528.

Force generation system 508 may have flattened any excess material such that a smooth surface is present for applying tape 524 to release film 530 in a manner that secures release film 530 around mandrel 528.

Figure 7:
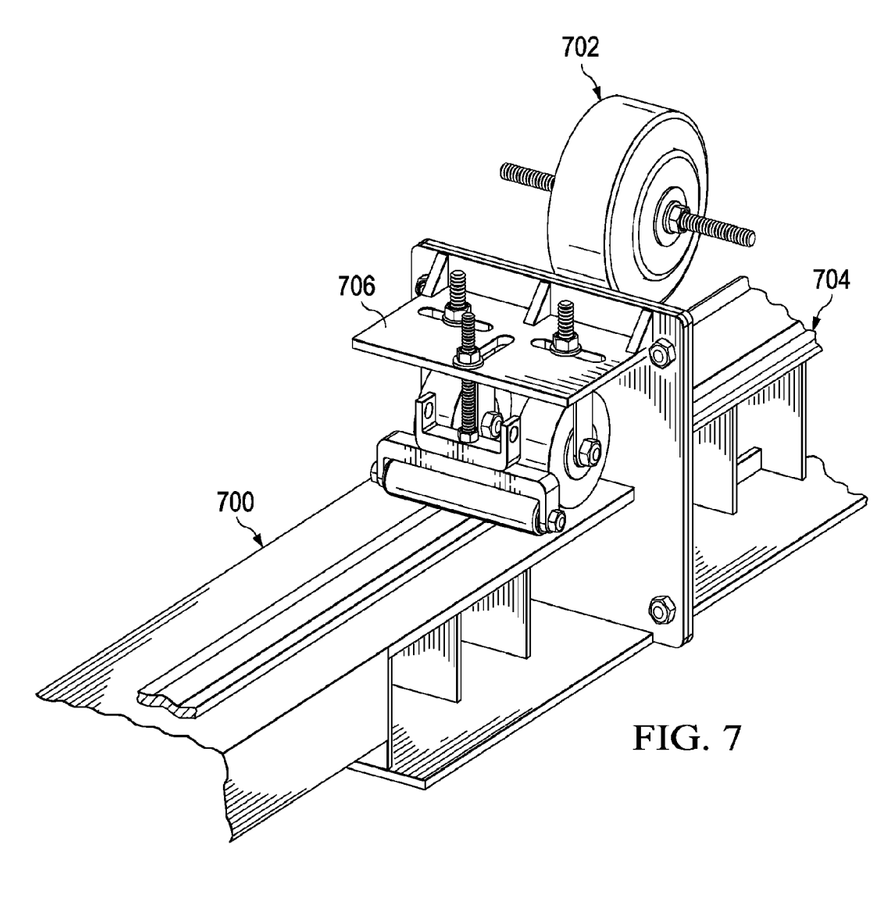
FIG. 7 is another example of a release system installation tool in accordance with an advantageous embodiment.

With reference now to FIG. 7, another example of a release system installation tool is depicted in accordance with an advantageous embodiment. In this example, release system installation tool 700 is another example of an implementation for release system installation tool 302 in FIG. 3. As illustrated, tape application system 702 is located between folding section 704 and force generation system 706.

The illustrations of release system installation tools in FIGS. 4-7 are not meant to imply physical or architectural limitations to the manner in which different release system installation tools may be implemented in different advantageous embodiments. The illustrations of these tools in the figures are presented as examples of some implementations for release system installation tool 302 in FIG. 3. Other release system installation tools may have other components in addition to, or in place of, the ones illustrated. Also, in some advantageous embodiments, some of the illustrated components may be unnecessary.

Figure 8:
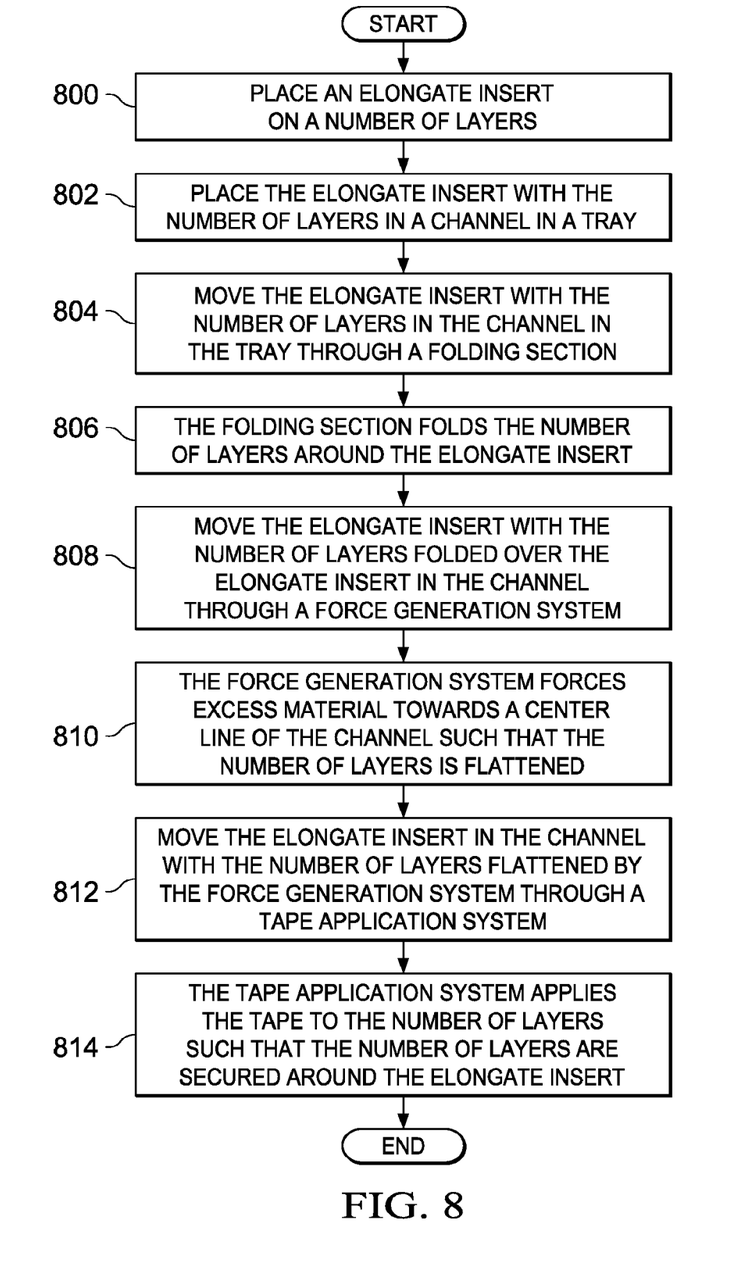
FIG. 8 is a flowchart of a process for wrapping an elongate insert with a release system in accordance with an advantageous embodiment.

With reference now to FIG. 8, a flowchart of a process for wrapping an elongate insert with a release system is depicted in accordance with an advantageous embodiment. The process illustrated in FIG. 8 may be implemented in elongate insert preparation environment 300. The elongate insert may prepare using release system installation tool 302 in elongate insert preparation environment 300.

The process begins by placing an elongate insert on a number of layers (operation 800). The process then places the elongate insert with the number of layers in a channel in a tray (operation 802). The elongate insert with the number of layers in the channel in the tray is moved through a folding section (operation 804). The folding section folds the number of layers around the elongate insert (operation 806). The elongate insert is moved in the channel with the number of layers folded over the elongate insert through a force generation system (operation 808).

The force generation system forces excess material towards a center line of the channel such that the number of layers is flattened (operation 810). The elongate insert is moved in the channel with the number of layers flattened by the force generation system through a tape application system (operation 812). The tape application system applies the tape to the number of layers such that the number of layers are secured around the elongate insert (operation 814), with the process terminating thereafter.

The illustration of the process in FIG. 8 is not meant to limit the manner in which elongate inserts may be prepared for use in manufacturing composite materials. In some advantageous embodiments, other operations may be used in addition to or in place of the ones illustrated. Further, some operations may be performed in different orders. For example, in some advantageous embodiments, the tape may be applied prior to the force generation system forcing excess material towards the center line of a channel.

Thus, the different advantageous embodiments provide a method and apparatus for preparing an elongate insert for use in manufacturing a composite part. In one or more advantageous embodiments, an apparatus includes a tray, a folding section, and a tape application system. The tray has a channel capable of receiving an elongate insert for a composite material with a number of layers for a release system.

The folding section is connected to the channel in a tray. The folding section may be connected by being attached to the tray or being formed as part of the tray. The folding section is capable of folding a number of layers around the elongate insert to cover the elongate insert as the elongate insert is moved through the folding section. The tape application system is capable of applying a tape to the release system covering the elongate insert to secure the release system around the elongate insert.

In this manner, elongate inserts may be covered with a release system and prepared for use in manufacturing composite materials. In the different advantageous embodiments illustrated in the examples, the release system may be wrapped around the elongate insert and secured around the elongate insert as the elongate insert is moved through the release system installation tool.

Further, elongate inserts may be moved through the release system installation tool in series such that each is processed and wrapped with the release system as it passes through the tool. The different advantageous embodiments provide a capability to more quickly prepare elongate inserts for manufacturing composite parts. Additionally, the different advantageous embodiments do not require the layers of the release system to have a set length. Instead, the layers may be cut before installation on the elongate insert or after installation.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for wrapping an elongate insert for a stringer with a release system, the method comprising:
    moving the elongate insert having a number layers for the release system in a channel in a tray through a folding section, wherein the folding section folds the number of layers around the elongate insert;
    moving the elongate insert in the channel with the number of layers folded over the elongate insert through a force generation system, wherein the force generation system further forces excess material towards a center line of the channel such that the number of layers are flattened; and
    moving the elongate insert in the channel with the number of layers flattened by the force generation system through a securing system configured to secure the number of layers covering the elongate insert to form the release system.

2. The method of claim 1, wherein the securing system is selected from one of a tape application system and a heat sealing system.

3. The method of claim 1, wherein the securing system applies a tape to the number of layers such that the number of layers is secured around the elongate insert.

4. The method of claim 1, wherein the force generation system comprises at least one of a number of rollers configured to apply a force to the excess material in the number of layers and a number of flexible flattening members configured to apply the force to the excess material in the number of layers.

5. The method of claim 2, wherein the tape application system comprises:
    a tape dispenser configured to dispense a tape; and
    a tape applicator roller configured to apply the tape dispensed by the tape dispenser onto the number of layers to secure the number of layers around the elongate insert.

6. The method of claim 1, wherein the elongate insert is selected from one of a mandrel and a bladder configured to be used to form a composite stringer.

7. The method of claim 1 further comprising:
    extracting the elongate insert covered by the release system from a cavity in a composite part after processing of the composite part.

8. The method of claim 7 further comprising:
    placing the elongate insert with the release system covering the elongate insert into the cavity in the composite part.

* * * * *